United States Patent [19]
Cyr

[11] Patent Number: 5,479,398
[45] Date of Patent: Dec. 26, 1995

[54] DIGITAL DATA CONCENTRATOR

[75] Inventor: Gregory J. Cyr, Winfield, Ill.

[73] Assignee: AT&T Corp, Murray Hill, N.J.

[21] Appl. No.: 362,061

[22] Filed: Dec. 22, 1994

[51] Int. Cl.⁶ .................................................. H04Q 11/04
[52] U.S. Cl. ............................................. 370/56; 370/112
[58] Field of Search .............................. 370/56, 112, 60, 370/58.1

[56] References Cited

U.S. PATENT DOCUMENTS

| | | | |
|---|---|---|---|
| 5,189,668 | 2/1993 | Takatori et al. | 370/56 |
| 5,256,958 | 10/1993 | Eng et al. | 370/56 |
| 5,412,646 | 5/1995 | Cyr et al. | 370/56 |

*Primary Examiner*—Douglas W. Olms
*Assistant Examiner*—Min Jung

*Attorney, Agent, or Firm*—Charles L. Warren

[57] ABSTRACT

First multiplexers have inputs connected to communication channels which carry inbound digital words. The output of each of the first multiplexers is coupled to a control buffer that has its output connected to a data input of a random access memory (RAM) of M columns and N rows. The RAM is capable of concurrently storing a digital word entered on each of its data inputs during each clock cycle. During a clock cycle each control buffer: (a) stores an associated inbound word received from a first multiplexer, (b) transmits the associated inbound word to a respective input of the RAM, or (c) does both (a) and (b). The control buffer operates to cause each column in the RAM to be completely filled with inbound words before another column in the RAM receives any inbound words. The packing of the RAM to avoid empty or "fill" cells makes the reading or withdrawing of information straightforward.

9 Claims, 2 Drawing Sheets

1

DIGITAL DATA CONCENTRATOR

CROSS REFERENCE TO RELATED APPLICATION

This application is related to the patent application Ser. No. 08/242,217 now U.S. Pat. No. 5,412,646 entitled "Asynchronous Transfer Mode Switch Architecture".

BACKGROUND INVENTION

This invention generally relates to digital data concentrators and more specifically, relates to a concentrator particularly suited for use in concentrating digital words representing samples of information transmitted over a telecommunication system.

Concentrators have been utilized in telecommunication systems to take advantage of the statistical probability that communication channels often only transmit information during a portion of the available transmission time. For example, a user may transmit data only in spurts such as a merchant requesting validation of a charge card before concluding a sale. Even the constant transmission of data at a relatively slow bit rate will appear as infrequent data from the perspective of a network element in which frames of data are handled at a rate much higher than the data bit rate. As long as such statistical probabilities are valid for a group of channels, the group of channels can be concentrated or coined onto a single transmission channel which is occupied substantially 100 percent of the time. Data words (samples) taken from the input channels of the group are packed onto the single channel.

A typical concentrator utilized in telecommunication systems combines a group of channels by first storing the digital words in each channel in a corresponding queue such as using a first in, first out buffer. The outputs of the buffers are connected to a selector which selects one of thee stored digital words during each clock cycle. Such an implementation requires independent FIFO buffers which are capable of operating at speeds sufficient to accommodate the storage and shifting of the digital words each clock cycle. Such memories are relatively expensive and require independent control. Thus, there exists a need for an improved concentrator which is more cost effective and eliminates the need for separate multiple word queues required to store the digital words associated with each communication channel.

SUMMARY OF THE INVENTION

It is an object of the present invention to provide a concentrator which provides a solution to the above-described problems. In accordance with the present invention, a concentrator is provided which utilizes a single random access memory to accommodate the storage of multiple digital words for each of the communication channels carrying the inbound digital words.

In accordance with an embodiment of the present invention, an exemplary concentrator includes first multiplexers which have inputs connected to communication channels which carry inbound digital words. The output of each of the first multiplexers is associated with one of the data inputs of a random access memory (M) of M columns and N rows. This memory is capable of concurrently storing a digital word entered on each of its data inputs during each clock cycle. Control buffers are connected between the outputs of each first multiplexer and a corresponding data input of the RAM. During every clock cycle each control buffer: (a) stores an associated inbound word received from a first multiplexer, (b) transmits the associated inbound word to a respective input of the RAM, or (c) does both (a) and (b). The control buffer operates in combination with the first multiplexers to cause a first column in the RAM to be completely filled with inbound words before another column in the RAM receives any inbound words. During each clock cycle, the digital words received at the inputs to the RAM are concurrently written to corresponding cell locations within one column of the RAM. The control buffer includes a one-word storage register for each memory data input; the registers are controlled to permit consecutive cells in each column of memory and consecutive columns of memory to be filled. The packing of the RAM to avoid empty or "fill" cells makes the reading or withdrawing information straightforward.

DETAILED DESCRIPTION

The exemplary embodiment of the present invention is described in three stages: the architecture and the connection of the elements; a general overview of the operation; finally, an illustrative example of the operation of the concentrator. An important aspect of the present invention resides in the realization of an architecture which permits a single RAM to be efficiently loaded with multiple inbound digital words during each clock cycle.

Architecture

Figure 1:
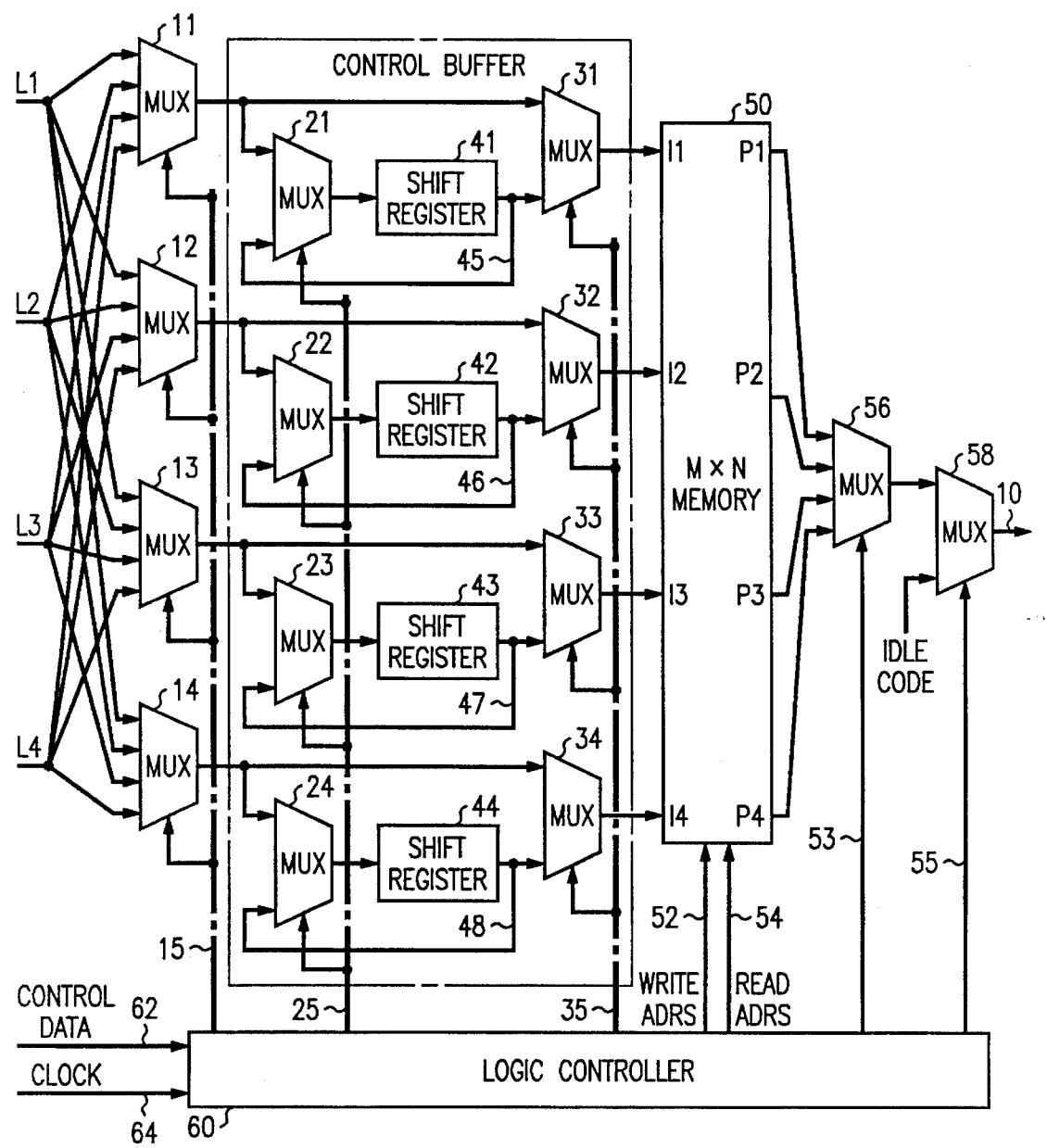
FIG. 1 is a block diagram of an embodiment of a concentrator in accordance with the present invention.

FIG. 1 illustrates an embodiment of a concentrator in accordance with the present invention in which four communication channels L1, L2, L3, and L4 carry inbound digital words. The concentrator relies on the longer term statistical probability that only one inbound digital word will be received from the group of inbound communication channels during each clock cycle. Output communication channel 10 from the concentrator outputs either an inbound digital word previously stored in the concentrator or an idle code during each clock cycle. During normal operating conditions, it is anticipated that relatively few idle codes will be generated as outputs. The general purpose of the concentrator is to maximize bandwidth utilization of channel 10 by condensing the information carried by a plurality of incoming communication channels onto a single outbound channel.

The communication channels L1–L4 are each connected to 4-by-1 multiplexers 11, 12, 13 and 14. Control signals coupled to each of these multiplexers by line 15 controls which of the input channels will be selected to be transmitted on the output of the respective multiplexers. The output of these multiplexers are provided as inputs to multiplexers 21, 22, 23 and 24 and to multiplexers 31, 32, 33 and 34, respectively. The other input of the 2-by-1 multiplexers 31–34 consists of the respective outputs of shift registers 41, 42, 43 and 44. The outputs of shift registers 41, 42, 43 and 44 also provide inputs to the respective multiplexers 21, 22, 23 and 24 by lines 45, 46, 47, and 48. Line 25 carries control signal to multiplexers 21-24 that determine which of the respective multiplexers' inputs are selected for transmission to its respective output which is connected to an input of an associated shift register. Line 35 likewise carries control signals to multiplexers 31-34 that control which of its inputs will be selected to be transmitted to its output. The outputs of multiplexers 31-34 are connected to memory inputs I1, I2, I3 and I4, respectively. A random access memory (RAM) 50 is organized as M columns and N rows of individual memory cells each capable of storing one bit of binary information. In the illustrative embodiment, a digital word can be written during each clock cycle on each of the inputs I1-I4 into memory 50. Four previously stored words in memory can be simultaneously output on outputs P1, P2, P3 and P4 during a clock cycle. Control lines 52 and 54 carry memory addresses identifying memory locations in which data is to be written to or read from, respectively. The outputs P1-P4 of memory 50 are connected as inputs to multiplexer 56 which has its output coupled as an input to multiplexer 58. The other input to multiplexer 58 comprises a predetermined idle code pattern. Lines 53 and 55 carry control signals that determine which input will be selected on multiplexers 56 and 58, respectively. The data output from multiplexer 58 comprises the output on outbound channel 10 which carries, during each clock cycle, either one of the stored digital words selected from memory 50 or the idle code pattern which is used as a "fill" word in the condition when no stored digital words are to be transmitted. Logic controller 60 receives control data information on line 62 and timing inputs from a clock on line 64. The purpose of the logic controller is to generate the respective control signals utilized on lines 15, 25, 35, 52, 54, 53, and 55. A central clock source (not shown) which is part of the telecommunication environment which incorporates the concentrator in accordance with the present invention, provides a clock reference to logic controller 60. It will be apparent to those skilled in the art that this clock information is also applied to each of the shift registers and RAM 50 in order to maintain synchronization in the transfer of the digital information associated with each element.

Figure 2:
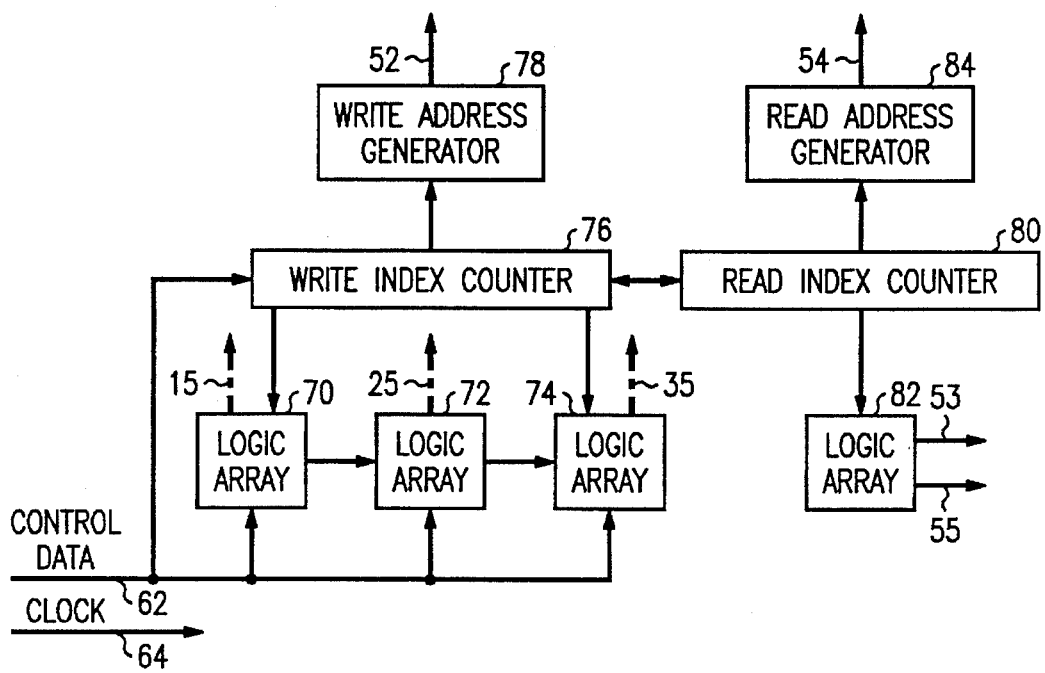
FIG. 2 is a block diagram of a logic controller as shown in FIG. 1.

FIG. 2 illustrates a functional block diagram of an illustrative embodiment of logic controller 60. Logic arrays 70, 72 and 74 generate the control signals transmitted on control lines 15, 25 and 35, respectively. Each of these arrays receive control data on line 62 and clock information from line 64. Logic array 70 also receives data from the write index counter 76 which contains a count that represents the location of an index (pointer) to the next cell to be used in RAM 50. Based on this information, the logic array 70 generates control signals on line 15 which controls each of multiplexers 11, 12, 13 and 14 and determines which of the inputs are selected to be coupled to the respective outputs of the multiplexers. The logic arrays may consist of a gate array configured to implement predefined Boolean functions or may comprise a circuit implemented state machine which can be utilized to generate the control signals transmitted. Logic array 72 generates control signals on line 25 to control the selection of inputs associated with multiplexers 21-24 based on the control data and based on information received from logic array 70 which defines which of the multiplexers 11-14 will be sending a digital word to its outputs during each clock cycle. Logic array 74 generates control signals on line 35 associated with multiplexers 31-34 to determine which of the inputs to couple to their respective outputs. The logic array 74 receives write pointer location information from counter 76, control data from line 62 and information from logic array 72 which identifies which of shift registers 41-44 contain a stored digital word. Based on this information, logic array 74 provides control signals on line 35 to control the selection of inputs associated with multiplexers 31-34. Logic array 72 and 74 may each comprise Boolean logic functions as implemented in a gate array or a state machine implementation which operates to provide the corresponding control outputs.

Write index counter 76 provides a cell pointer indicating the next available memory cell to which new information is to be written and maintains a column pointer corresponding to the current column locations in RAM 50 of the next available cell. These pointers are updated each clock cycle. Counter 76 receives the control data information on line 62 which may, in the illustrative embodiment, consist of four bits of digital data wherein each bit signifies whether a digital word is contained on communication channels L1, L2, L3 and L4, respectively. Thus, the write index counter 76 receives information which defines the number of digital words received during each clock cycle and increments the counter by that number. The control data information in combination with the predetermined logic used to write digital words to RAM 50 permits the write index counter to maintain a pointer which identifies the column location and the cell in the column in RAM 50 to which the next new digital word is to be written. A write address generator 78 receives information concerning the location of the pointer from counter 76 and generates on line 52 a write address to RAM 50 which defines the column in which data at inputs I1-I4 will be stored during each clock cycle.

The control logic 60 also is utilized to provide control for the reading of stored digital data from RAM 50. A read index counter 80 is similar to write index counter 76 in that it maintains a pointer or index directed to the next digital word stored in RAM 50 to be read. This index is incremented by 1 during each read clock cycle since only a single digital word is output during each read clock cycle on output channel 10. Although only a single word is output, all four outputs P1-P4 which correspond to one column in RAM 50 can be read during each clock cycle. Logic array 82 receives information concerning the memory location of the word to read from counter 80 and generates control signals on lines 53 and 55 to control the input selection of multiplexers 56 and 58, respectively. The logic array 82 may comprise a predetermined gate array which implements predetermined Boolean logic or may comprise a state machine which generates the required control signals based on the memory location data obtained from counter 80. Assuming that a column in RAM 50 contains four digital words which are read (appear at outputs P1, P2, P3 and P4) during each of the four clock cycles, logic array 82 generates control signals on line 53 which sequentially selects the output of P1, P2, P3 and P4 during the four clock cycles in order to read all of the four stored digital words in a single column. Should the read pointer indicate a location in memory 50 in which no digital words are stored, logic array 82 generates a control signal on line 55 indicating an "empty" condition which causes the idle code input to multiplexer 58 to be selected resulting in an idle code word being generated on output channel 10 during such a clock cycle. A read address generator 84 generates a read address on line 54 which controls the column to be read during each clock cycle based on the last memory position pointed to by counter 80.

Figure 3:
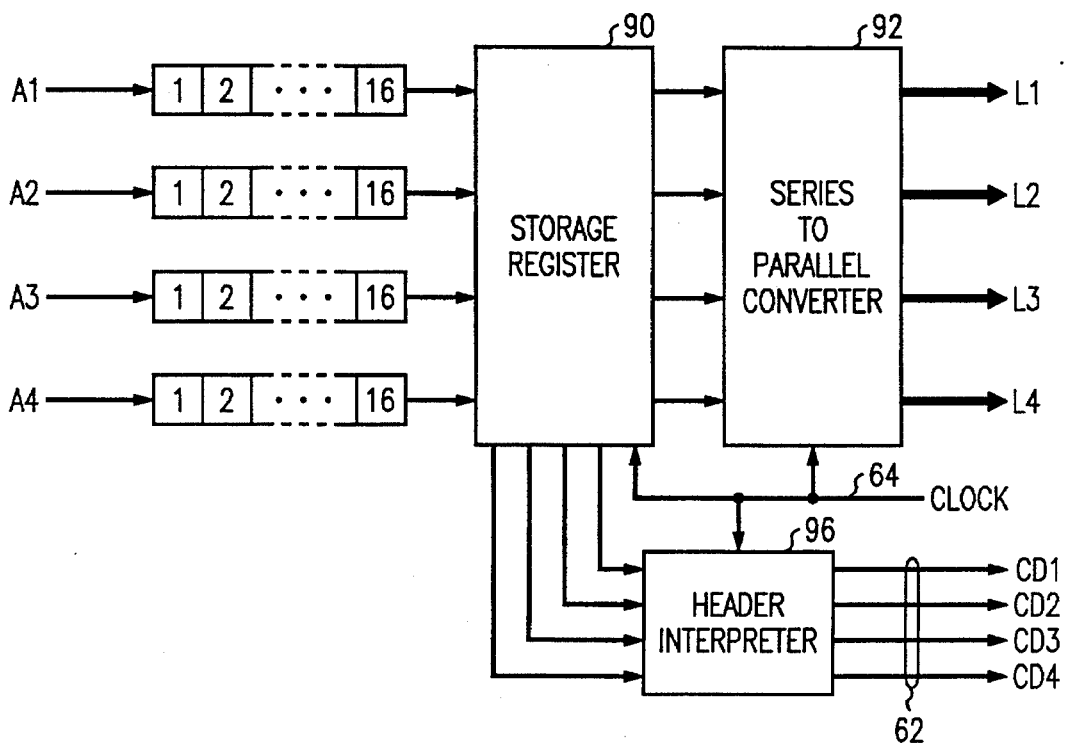
FIG. 3 illustrates a block diagram of an incoming data monitor which generates controlled data utilized by the concentrator of FIG. 1.

FIG. 3 illustrates a block diagram of an incoming data monitor which generates control data on lines 62. In the illustrative embodiment, serial communication lines A1, A2, A3 and A4 each carry a 16 bit word during every clock cycle. Each word contains a header and a payload which contains end user information or a null value representing no user data. A storage register 90 stores each serial word in preparation for the series to parallel converted 92 converting each word into a corresponding 16 bit parallel word during the next clock cycle. The parallel output words are transmitted on lines L1, L2, L3 and L4, respectively, which provide inputs to multiplexers 11–14. The header interpreter 96 compares the headers of each serial word in order to determine whether the payload contains user data or a null value. Each header follows a predetermined coding rule which indicates the nature of its payload. The interpreter generates during each clock cycle a one or zero on control data lines 62 (CD1, CD2, CD3 and CD4): a one representing a user data payload and a zero representing a null value payload. Thus, each bit defines whether a corresponding digital word on channels L1, L2, L3, and L4 must be routed towards its destination or can be ignored as containing a null or empty value.

GENERAL OPERATION

Referring to FIG. 1, it will be noted that four identical control buffers are associated with each of the data inputs I1, I2, I3, and I4 of RAM 50. In the illustrative embodiment, the RAM consists of a matrix of M columns by N rows wherein M=64 and N=128. The M columns each accommodate four digital words of 16 bits length (4×16=64); the N rows represent the depth of the storage capability which is preferably related to the maximum incoming burst of data to be handled without data loss. It will be noted that each of the four sets of elements have the same suffix reference numbers, e.g. multiplexer 11, multiplexer 21, multiplexer 31, and shift register 41. Incoming data words are routed by top-to-bottom priority (relative to FIG. 1 orientation) to the first of the multiplexers 21–24 coupled to an input of RAM 50 associated with the memory cell to receive the next digital word. During each clock cycle, the shift registers 41–44 can receive and store a new digital word if one is output from the associated multiplexer. The selection of an input of multiplexers 31–34 to be transmitted on its output to a respective but of RAM 50 during each clock cycle depends on whether a digital word stored during a prior clock cycle in an associated shift registers to be received as an input or whether a new digital word received during the current clock cycle from a corresponding multiplexers 11–14 is to be transmitted as an input to RAM 50. This selection process is based on predetermined logic which is more specifically explained by the following example.

The architecture of he concentrator shown in FIG. 1 permits a single M by N RAM to be utilized as buffer storage in order to accommodate a predetermined temporary increase beyond the anticipated average of one word during each clock cycle without causing loss of information as transmitted on output channel 10. During each clock cycle, four digital inputs are concurrently written to RAM 50. Each of the four inputs to RAM 50 are written to a corresponding one of the four positions in the same column in RAM 50. That is, the input on I1 is written to the top-most storage element in a column, the input on I2 is written to the next storage element in the same column, the I3 data is written to the third position in the same column and the data on I4 is written to the last position in the same column. The four data inputs are written to memory during each clock cycle regardless of the receipt of digital words. In order to accomplish consecutive and complete packing of each cell in each column with digital words, words previously stored in the column may be overwritten with the same digital word in order to allow the storage of additional data words so that four digital words are always stored in each column. If, for example, memory positions 1, 2, and 3 in a column have been previously written with a digital word(s) R, S, and T, and during the next clock cycle two new digital words (U, V) are received, one of the new digital words (U) is routed by multiplexer 14 to input I4 for storage in the last position of the prior column, and the other new digital word (V) is routed by multiplexer 11 to shift register 41 for temporary storage. As the new word is written into shift register 41, the old digital word (R) stored in shift register 41 is output through multiplexer 31 to input I1 and is utilized to overwrite the first cell in the column with the same information (R) previously stored in the same cell. Words S and T stored in registers 42 and 43 are also rewritten to cells 2 and 3 by inputs I2 and I3. At the end of the described clock cycle, a full column of digital words (R, S, T, U) will have been stored in RAM 50 and the index moved to the first memory cell in the next column representing the first available cell in the first column having available cells. At the end of this clock cycle, shift register 41 holds the contents of the digital word (V) which could not be written to memory since only a given column of memory can be written during each clock cycle. This process continues during each clock cycle, thereby writing, rewriting, and eventually filling each column of memory 50. When the last column of memory 50 has been filled, the pointer is returned to the first column in memory 50, thereby defining a circular memory in which continuous incoming digital words are written and stored in the RAM 50.

The read or output cycle involving RAM 50 is similar in that each of the four memory cells in a column is output during a clock cycle on the respective outputs P1, P2, P3 and P4 to multiplexer 56. The control signal on line 53 identifies one of the input words to be transmitted as an output to multiplexer 58 which, in turn, couples it to the output channel 10 during each clock cycle. Thus, four consecutive clock cycles are required in order to read cell positions 1, 2, 3 and 4 in a given column. The read pointer or index as controlled by counter 80 maintains the location in memory of the current column in the memory and of the memory cell location within the column to be read. After a complete column has been read, the new pointer is moved to the next succeeding column and the cell pointer moved to the first cell position in the column. Typically, the read index lags the write index by a number of memory columns while accommodating a momentary burst of incoming data which exceeds the outgoing data rate. The output read cycle operates as a circular memory with a read pointer which lags the write pointer.

EXAMPLE OF OPERATION

In the following example of operation, the exemplary concentrator shown in FIG. 1 is assumed to utilize a RAM 50 in which each column of memory accommodates four digital words (each word stored in one of four cells) and that each cell in a column of memory is written to each clock cycle. The Table illustrates five exemplary consecutive clockcyclies. For each clock cycle, four rows in the Table correspond to the four sets of elements associated with the memory inputs I1, I2, I3 and I4, respectively.

The "Channel Data to Mux" column identifies whether a digital word is transmitted on communication channels L1, L2, L3 and L4 during the respective clock cycle. The nomenclature utilized in the Table to identify inputs from the communication channels is as follows: the leading digit identifies the associated clock cycle; the second digit identifies whether a digital word was transmitted during the clock cycle with a "1" meaning a word was transmitted and a "0" meaning a word was not transmitted; the hyphenated suffix digit identifies one of the four incoming channels.

The "Channel Data from Mux" column shows the output of multiplexers 11, 12, 13 and 14, respectively, during the clock cycle. The same nomenclature as previously explained. This allows the reader to discern which of the inputs of the multiplexer was selected for output transmission.

The "Shift Register Mux" column identifies for each of multiplexers 21, 22, 23 and 24, respectively, which of the inputs are selected during each clock cycle. A "1" represents the output from the associated 1_multiplexer is selected and a "0" represents that the input from the corresponding 4_shift register output is selected. Similarly, the "RAM Mux" column identifies which of its inputs is selected with a "1" representing the output of the associated 1_multiplexer is selected and a "0" representing that the output of the associated 4_shift register is selected.

The "RAM Cells Written" column identifies, for each of the four memory cells in the current column being addressed in RAM 50, the digital word, if any, written during the clock cycle. The same nomenclature as explained for the "Channel Data to Mux" column is maintained. The Table in conjunction with the description of the examples explains the logic implemented by logic controller 60 to control the writing of inbound digital words to RAM 50.

Prior to clock cycle 1, it is assumed that the write address pointer of RAM 50 is pointing to! a first memory cell in a column indicating that a preceding column is completely filled with four digital words (or that this is an initial start up with no digital word in memory). It is further assumed that all digital words received during a prior clock cycle have already been written to the prior column in memory 50. In view of these conditions, the operation of the concentrator will be explained with retard to five consecutive clock cycles as represented in the Table.

Referring to the Table and FIG. 1, inbound communication channels L1, L3 and L4 contain digital words during the first clock cycle as represented by 11-1, 11-3, and 11-4, respectively. Channel L2 does not carry a digital word during the first clock cycle as represented by 10-2. During this clock cycle control data of "1011" on line 62 is received by logic controller 60 which identifies corresponding communication channels which have and do not have incoming words. The outputs of multiplexers 11, 12, 13 and 14 are 11-1, 11-3, 11-4 and 10-2, respectively. In accordance with the logic of the exemplary embodiment, an incoming word is prioritized based on its associated incoming channel with L1 having the greatest priority and L4 having the lowest priority. Any channels having a digital word take priority over a channel which does not carry a digital word. This priority rule is implemented by logic array 70 in logic controller 60 which generates control signals transmitted to the multiplexers 11–14 to control input selection of the communication channels.

During a given clock cycle, the highest priority digital word is routed to multiplexer 2_associated with the input of RAM 50 which is written to the next "empty" memory cell indicated by the pointer maintained by counter 76. The next "empty" memory cell is the first cell in a column which has not received a new digital word since the column was addressed. An "empty" cell may actually contain a previously stored word which has been read and now will be overwritten. In the illustrative example at the beginning of clock cycle 1, since the first memory cell in the selected column is empty, the digital word 11-1 associated with the highest priority channel is shifted to the output of multiplexer 11. The next highest priority digital word 11-3 is shifted to the output of multiplexer 12, followed by the digital word 11-4 being shifted by multiplexer 13 to its output. Line L2, which contained no digital word, results in null word being 10-2 shifted by multiplexer 14 to its output.

The rule during each clock cycle for controlling the selection of inputs of multiplexers 21–24 is that the input associated with the corresponding output of the associated multiplexer 1_is selected whenever the output contains a digital word. That is, every new incoming digital word from the output of an associated multiplexer is always selected and stored in shift register 4_. When the associated output of a multiplexer does not contain a digital word during the clock cycle, the multiplexer $2_2$ selects the other input consisting of the output of its associated shift register $4_4$. Control signals on line 25 generated by logic array 72 implement this rule. Referring to clock cycle 1 in the Table, the outputs of multiplexers 11, 12 and 13 contain new digital words 11-1, 11-3, and 11-4, and hence, multiplexers 21, 22, and 23 select each corresponding output. The output of multiplexer 14 contains a null word 10-2 (effectively a "don't care" word) rather than a digital word, resulting in multiplexer 24 being controlled to select its other input, i.e. the output of shift register 44. This causes the contents of shift register 44 to be effectively circulated within the shift register inputs during the clock cycle. The selection of multipliers 21–24 are reflected in the "shift register multiplexer" column of the Table by 1's which represent the selection of an output from the associated multiplexer 1_and 0's representing the other multiplexer input which is associated with the output of its associated shift register 4_.

The "RAM Mux" column in the Table reflects which of the inputs of multiplexers 31, 32, 33 and 34 are selected. A "1" reflects the input from an associated multiplexer 1_being selected and a "0" reflects the multiplexer selecting an input coupled to the output of its associated shift register 4_. The input selection of these multiplexers is controlled by control signals sent on line 35 by logic array 74 of logic controller 60 which implements input selections in accordance with the following rule. If the shift register $4_4$ associated with a RAM multiplexer 3_contains a digital word stored during a previous clock cycle, and if the write pointer has not moved to a new column in memory since the storage of the word in the shift register 4_, the associated RAM multiplexer 3_ selects its input to be the output of the associated shift register 4_. If the new index of RAM 50 has shifted to a new column after the storage of a digital word in a shift register 4_, then the RAM multiplexer 3_will select as its input, the output of the associated channel multiplexer 1_ since this represents a new word to be written to an associated memory cell in the current column indexed in the memory.

The "RAM Cells Written" column reflects digital words written to the four memory cells in a column of memory during the clock cycle. However, it will be understood that each column of memory may be written to during more than one clock cycle. A "0" in this column represents a "don't care" data word being written to the associated memory cell(s); such "don't care" words are eventually overwritten with a digital word before the column pointer shifts to the next column.

At the conclusion of clock cycle 1 as illustrated in the Table, memory cell positions 1, 2, and 3 will contain digital words 11-1, 11-3, and 11-4, respectively, and cell position 4 will contain a "don't care" word. Shift registers 41, 42, and 43 will likewise have received and stored digital words 11-1, 11-3, and 11-4, respectively. The column index to memory 50 will not have advanced since the fourth position is an "empty" memory cell.

In clock cycle 2, new digital words are received on channels L2 and L4 as represented by 21-2 and 21-4, respectively. Since at the conclusion of the preceding clock cycle 1, memory position 4 was empty, the highest priority incoming digital word (21-2) is mapped to the output of multiplexer 14 and the next highest digital word (21-4) is mapped to the "next" incoming channel multiplexer, multiplexer 11; the multiplexers 1_are viewed for this purpose as comprising a circular pattern where 11 follows 14. Corresponding to the receipt of new data during the clock cycle, multiplexers 24 and 21 route the new received words to each's associated shift register 44 and 41. Multiplexers 22 and 23 select an input associated with the output of each's associated shift register 42 and 43, thereby recirculating information stored in these shift registers. RAM multiplexers 31, 32 and 33 select inputs from the associated shift registers 41, 42, and 43 since each shift register contained a prior stored word and since the column index of memory 50 had not shifted to a new column. However, multiplexer 34 selects the output of multiplexer 14 as an input since its associated shift register 44 did not contain a digital word stored since the last changing of the column index of memory 50. Thus, during clock cycle 2, the same column of memory is again written, i.e. rewritten with digital words 11-1, 11-3, 11-4 and 21-2 being written to the respective cell positions 1, 2, 3 and 4.

Clock cycle 3 begins with shift register 41 holding digital word 21-4 received during clock cycle 2 but not written to a cell in the RAM memory. Two new incoming digital words 31-1 and 31-4 are received on channels L1 and L4 and are routed to the outputs of multiplexer 12 and 13, respectively. Shift registers 42 and 43 receive the new digital words during clock cycle 3. RAM multiplexer 31 selects the output from shift register 41 while multiplexers 32 and 33 select inputs from multiplexers 12 and 13, respectively. Multiplexer 34, which could be considered a "don't care" state, selects the output of shift register 44. Thus, during clock cycle 3, a new column in memory has cells 1, 2 and 3 receive digital words 21-4, 31-1, and 31-4, respectively. Cell position 4 receives the output of shift register 44 which will be overwritten when the next new digital word is received. The column index from RAM 50 does not shift at the conclusion of clock cycle 3 since memory position 4 remains to be filled with new digital word; however, the memory cell index is positioned at cell 4 of this column.

At the beginning of clock cycle 4, shift registers 41, 42, and 43 contain digital words 21-4, 31-1, and 31-4, respectively. Four new digital words 41-1, 41-2, 41-3, 41-4 are received. The highest priority word 41-1 is routed to output of multiplexer 14 which corresponds to the next open memory cell and the remaining digital words are routed to the outputs of multiplexers 11, 12, and 13, respectively. Multiplexers 21–24 each select input from the new incoming words and store the new incoming words to their respective shift registers. Since shift registers 41, 42, and 43 contain a prior stored digital word and since the column index to memory 50 had not changed since their storage, multiplexers 31, 32, and 33 select the outputs from the shift registers to be written during clock cycle 4, causing digital words 21-4, 31-1, and 31-4 to be written, respectively, to memory cells 1, 2, and 3 associated with inputs I1, I2, and I3. Multiplexer 34 selects the output of multiplexer 14 since the shift register 44 did not hold a digital word awaiting storage, thereby causing digital word 41-4 to be written to the fourth memory position in the currently addressed column. Since a complete column is written during cycle 4, the column index to memory 50 is incremented to point to the next column for the next clock cycle.

At the beginning of clock cycle 5, shift registers 41, 42, and 43 contain digital words 41-2, 41-3, and 41-4 received during clock cycle 4, and are waiting to be written to RAM 50. During clock cycle 5, a new digital word 51-1 is received on L1 and is routed by multiplexer 14 to its output. Multiplexers 21, 22, and 23 select inputs associated with each's shift register 41, 42, and 43, therefore circulating the information in shift registers 41, 42, and 43, respectively. Multiplexer 24 accepts the output of multiplexer 14 as an input since this represents a new digital word and it stores the results in shift register 44. RAM multiplexers 31, 32, 33 select inputs from each's associated shift register 41, 42, and 43 since previously written digital words are stored and since the words have not been written to the memory 50 since the last change of the column index of the memory. Multiplexer 34 selects the output of multiplexer 14 as an input since shift register 44 did not contain a prior digital word awaiting storage. Thus, during clock cycle 5, memory cells 1, 2, 3, and 4, in the current column of memory determined by the RAM 50 column index, receive digital words 41-2, 41-3, 41-4 and 51-1, respectively. Following clock cycle 5 the column index of the memory is incremented to the new column and the memory cell position is incremented to the first in the new column since at the conclusion of clock cycle 5 a complete column of memory had been written. Furthermore, since no digital words are stored in any of the shift registers which have not been previously written to a location in memory 50, the clock cycle 6 will begin with initial conditions as previously explained for the starting for clock cycle 1.

The reading of stored words in memory 50 employs the conventional application of the use of a read index (pointer) with the circular memory 50 in which consecutive words stored in memory are sequentially read and transmitted on channel 10. Since the outputs P1–P4 of memory 50 provide parallel outputs of four digital words during each clock cycle, a counter capable of counting to 4 (64 bits in groups of 16) can be utilized to maintain a read cell index which operates with a read column index to identify the next digital word to read. When the last digital word in a column is read, the read cell counter is reset and the column counter is incremented, thereby providing a sequential reading of each cell and a sequential reading of columns. When the last cell in the last column of memory is read, the column counter is reset to begin at the initial column, thereby forming a circular reading operation.

The write pointer is compared with the read pointer to determine if additional words can be written in the RAM. If the write pointer is about to reach the read pointer, the RAM is full and further writes are temporarily prevented. The RAM continues to be read until all stored data has output. Preferably an error condition is reported by the concentrator to the system which must then determine the recovery action to be taken.

Various designs are possible when the write index approaches the read index, such as which could occur with a statistically high rate of input digital words causing the write index to effectively overrun or overlap the position of the read index. Although not part of the present invention, it will be understood by those skilled in the art that one implementation to handle this error condition is to cease the further storage of incoming digital words until the read index has recovered to a position beyond the write index by a predetermined distance. During such a condition, it will be apparent that incoming data received during this hiatus in the storage of incoming words will be lost unless safeguards are provided.

If the read pointer points to a cell which has not been yet written, the memory is empty and an idle code associated with multiplexer 58 is selected to be output during the corresponding transmission of a digital word on output channel 10.

Although the illustrative embodiment of the present invention utilized four incoming communication lines which could supply a maximum of four new 16 bit digital words per clock cycle, it will be understood that a corresponding equivalent architecture could be utilized to accommodate a smaller or larger number of incoming digital lines and/or digital words. In accordance with the embodiment of the present invention, four digital words could be written to memory during each clock cycle which coincided with the maximum number of digital words which could be received during the clock cycle. Fewer maximum incoming words during a clock cycle could be easily accommodated by embodiment of the present invention. The shift registers contain only a single digital word in temporary storage, the maximum number of incoming digital words during a clock cycle can not exceed the maximum number of digital words which could be written to memory during a clock cycle. Of course, fewer than such a maximum of incoming digital words can be accepted. The number of shift registers required is the same as the width of the memory. The width of the memory is determined by matching its writing bandwidth with the sum of all the input bandwidths.

Although an embodiment of the present invention has been described herein and illustrated in the drawings, the scope of the invention is defined by the claims which follow.

TABLE

|   | Channel Data to Mux | Channel Data from Mux | Shift Register Mux | RAM Mux | RAM Cells Written |
|---|---|---|---|---|---|
|   | CLOCK CYCLE 1 | | | | |
| 1 | 11-1 | 11-1 | 1 | 1 | 11-1 |
| 2 | 10-2 | 11-3 | 1 | 1 | 11-3 |
| 3 | 11-3 | 11-4 | 1 | 1 | 11-4 |
| 4 | 11-4 | 10-2 | 0 | 0 | 0 |
|   | CLOCK CYCLE 2 | | | | |
| 1 | 20-1 | 21-4 | 1 | 0 | 11-1 |
| 2 | 21-2 | 20-1 | 0 | 0 | 11-3 |
| 3 | 20-3 | 20-3 | 0 | 0 | 11-4 |
| 4 | 21-4 | 21-2 | 1 | 1 | 21-2 |
|   | CLOCK CYCLE 3 | | | | |
| 1 | 31-1 | 30-2 | 0 | 0 | 21-4 |
| 2 | 30-2 | 31-1 | 1 | 1 | 31-1 |
| 3 | 30-3 | 31-4 | 1 | 1 | 31-4 |
| 4 | 31-4 | 30-3 | 0 | 0 | 0 |
|   | CLOCK CYCLE 4 | | | | |
| 1 | 41-1 | 41-2 | 1 | 0 | 21-4 |
| 2 | 41-2 | 41-3 | 1 | 0 | 31-1 |
| 3 | 41-3 | 41-4 | 1 | 0 | 31-4 |
| 4 | 41-4 | 41-1 | 1 | 1 | 41-1 |
|   | CLOCK CYCLE 5 | | | | |
| 1 | 51-1 | 50-2 | 0 | 0 | 41-2 |
| 2 | 50-2 | 50-3 | 0 | 0 | 41-3 |
| 3 | 50-3 | 50-4 | 0 | 0 | 41-4 |
| 4 | 50-4 | 51-1 | 1 | 1 | 51-1 |

I claim:

1. A concentrator comprising:

first multiplexers wherein each first multiplexer has inputs connected to respective communication channels that carry inbound words of digital data and has an output channel for carrying an inbound word associated with one of the communication channels;

random access memory organized as M columns and N rows capable of accepting and storing up to I of the inbound words during a single clock cycle in one of the M columns, where I is a positive integer greater than one and less than N, the memory having I data inputs;

control buffer means, connected between each output channel and the I data inputs, for selecting one of (a) storing an associated inbound word, (b) transmitting the associated inbound word to the respective I data input, and (c) doing both (a) and (b) during each clock cycle, the first multiplexers and control buffer means being responsive to control signals wherein the inbound word coupled to the output of each of the first multiplexers and the one selected by the control buffer means for each clock cycle is determined by the control signals;

the first multiplexers and control buffer means operating in response to the control signals and causing a first column in the random access memory to be completely filled with inbound words before another column in the random access memory can receive any inbound words.

2. The concentrator according to claim 1 wherein the control buffer means comprises shift registers having inputs coupled to corresponding first multiplexers and outputs coupled to associated I data inputs for storing one of the inbound words.

3. The concentrator according to claim 2 wherein the control buffer means further comprises first routing means associated with each shift register for routing to the shift register's input one of an inbound word from the associated first multiplexer and a inbound word previously stored in the shift register from the shift register's output.

4. The concentrator according to claim 2 wherein the control buffer means further comprises second routing means associated with each data input of the random access memory for routing to the associated memory data input either an inbound word from an output of an associated first multiplexer or an inbound word stored in an associated shift register from the shift register's output during each clock cycle.

5. The concentrator according to claim 1 further comprising outbound multiplexing means coupled to the random access memory for selecting one of the inbound words stored in the random access memory during each clock cycle and transmitting the selected inbound word on an outbound transmission channel.

6. A method for concentrating inbound words received concurrently on communication channels into a stream of outbound words transmitted on an outbound channel, the method comprising the steps of:

using a random access memory to temporarily store the inbound words, the random access memory organized as M columns and N rows capable of accepting and storing up to I of the inbound words during a single clock cycle in one of the M columns, where I is a positive integer greater than one and less than N, the memory having I data inputs;

selectively storing an inbound word in a buffer coupled to each I data input;

routing each inbound word on the communication channels to one of the buffers during each clock cycle;

during each clock cycle for each I data input, selecting one of (a) storing an inbound word in the associated buffer, (b) transmitting the corresponding inbound word to the respective I data input, and (c) doing both (a) and (b);

controlling the writing of inbound words in a first column in the random access memory so that the first column is completely filled with inbound words before another column in the random access memory receives any inbound words.

7. The method according to claim 6 further comprising the step of filling the columns of the random access memory so that adjacent columns are consecutively filled.

8. The method according to claim 6 further comprising the step of writing to each of the I data inputs which corresponds to I storage cells in one column of the random access memory during each clock cycle.

9. The method according to claim 8 further comprising the step of overwriting first inbound words stored during a first clock cycle in first cells of a first column of the random access memory with the same corresponding first inbound words which were stored in associated buffers, the overwriting occurring during a second clock cycle immediately following the first clock cycle while concurrently writing other inbound words to second cells in the first column of memory.

* * * * *